United States Patent [19]

Takashima

[11] Patent Number: 5,767,475
[45] Date of Patent: Jun. 16, 1998

[54] HOT ROLLING METHOD

[75] Inventor: Koichi Takashima, Toyonaka, Japan

[73] Assignee: Kyoei Steel co., Ltd., Hirakata, Japan

[21] Appl. No.: 551,611

[22] Filed: Nov. 1, 1995

[30] Foreign Application Priority Data

Sep. 29, 1995 [JP] Japan ................ 7-276643

[51] Int. Cl.$^6$ ................ B23K 11/00; B21B 1/46
[52] U.S. Cl. ................ 219/117.1; 29/527.7
[58] Field of Search ................ 219/55, 78.16, 219/79, 80, 117.1; 29/527.5, 527.7, 33 B, 33 P, 33 Q, 33 S; 228/158, 159

[56] References Cited

U.S. PATENT DOCUMENTS

| | | | |
|---|---|---|---|
| 4,294,394 | 10/1981 | Lida et al. | 228/158 |
| 4,577,384 | 3/1986 | Bricmont | 29/460 |
| 4,626,647 | 12/1986 | Takeda et al. | 219/97 |
| 4,850,522 | 7/1989 | Nichols | 228/159 |
| 5,222,282 | 6/1993 | Sukonnik et al. | 29/17.9 |
| 5,463,801 | 11/1995 | Kajiwara et al. | 29/33 Q |
| 5,564,178 | 10/1996 | Takashima et al. | 29/527.7 |

Primary Examiner—Matthew V. Nguyen
Attorney, Agent, or Firm—Wenderoth, Lind & Ponack

[57] ABSTRACT

To provide a hot rolling method capable of improving the yield ratio by reducing material loss and improving productivity and quality accuracy of rolled products, the hot rolling method according to the present invention consists of putting the front end face of the subsequent rolled material in contact with the rear end face of the preceding rolled material by setting the feed speed of the material rolled by the roughing-down mill faster than the feed speed of the material rolled by the intermediate rolling mill while holding the rear end of the preceding rolled material being rolled in the intermediate rolling mill with the holding member on one side and holding the front end of the subsequent rolled material being rolled in the roughing-down mill with the holding member on the other side, welding both rolled materials between the roughing-down mill and the intermediate rolling mill by performing contact resistance heating with the application of voltage to the contact faces of both rolled materials through said holding members, and continuously rolling the welded rolled materials with the intermediate rolling mill and the finishing mill to form them into bar steel, wire rod, bar-in-coil, etc.

4 Claims, 1 Drawing Sheet

HOT ROLLING METHOD

BACKGROUND OF THE INVENTION

The present invention relates to a hot rolling method for forming bar steel, wire rod, bar-in-coil, etc. from billets or cast pieces, etc. supplied from a continuous casting system, etc.

Conventionally, in hot rolling methods for forming bar steel, wire rod, bar-in-coil, etc. (hereinafter referred to as "rolled products") from rolling billets or cast pieces, etc. supplied from a continuous casting system, etc. in a rolling system composed of a roughing-down mill, an intermediate rolling mill, a finishing mill, etc. after heating them in a heating system, the size (weight) of the rolled materials such as billets or cast pieces, etc. determines the size (weight, length) of the rolled products manufactured.

For that reason, to manufacture rolled products of a specified size (weight, length) with high accuracy and little material loss, it is necessary to adjust the size (weight) of the rolled materials to the size of the rolled products.

However, it is practically impossible to adjust the size (weight) of the rolled materials to the size of the rolled products, and this results in an unevenness of size (weight, length) of the rolled products formed from the final cut pieces of the rolled products formed from one load of rolling material.

In this way, conventional hot rolling methods, which bring about unevenness in the size of rolled products formed from the final cut pieces, have the problem of not only producing material loss but also of lowering productivity and quality accuracy because of the mixing of uneven products among the rolled products and intermittent rolling for each rolled material in the rolling system.

SUMMARY OF THE INVENTION

The purpose of the present invention is to provide a hot rolling method which can solve the problems of the conventional hot rolling methods, improve the yield ratio by reducing material loss and improve productivity and quality accuracy of rolled products.

To achieve the purpose, the hot rolling method of the present invention holds the rear end of a preceding rolled material under rolling in an intermediate rolling mill with a holding member on one side, putting the front end face of the subsequent rolled material in contact with the rear end face of the preceding rolled material. This procedure is made possible by setting the feed speed of the material being rolled by the roughing-down mill faster than the feed speed of the material being rolled in the intermediate rolling mill, while holding the end of the subsequent rolled material being rolled in the roughing-down mill with the holding member on the other side. Both rolled materials are welded between the roughing-down mill and the intermediate rolling mill by performing contact resistance heating with the application of voltage to the contact faces of both rolled materials through the holding members, and continuously rolling the welded rolled materials with the intermediate rolling mill and the finishing mill to form them into bar steel, wire rod, bar-in-coil, etc.

In such a case, it is possible to weld the front end face of the subsequent rolled material to the rear end face of the preceding rolled material while pressurizing them by means of the holding members and/or set, after the front end face of the subsequent rolled material has been put in contact with the rear end face of the preceding rolled material. The feed speed of the material rolled by the roughing-down mill is at the same feed speed as that of the material rolled by the intermediate rolling mill.

In the present invention, the preceding rolled material and the subsequent rolled material are welded between the roughing-down mill and the intermediate rolling mill when the rolled materials are hot and in a rolling state. The surface area of the end face of the rolled materials is of a size suitable for welding (if the surface area of the end face of the rolled materials is large, it is difficult to perform uniform welding in a short time), and with the welded rolled materials being continuously rolled by the intermediate rolling mill and the finishing mill, it is possible to easily weld the rolled materials to each other in a short time and highly accurately, without influencing the other processes. Rolled products of a specified size (weight, length) are produced without material loss and with improved productivity and quality accuracy of rolled products, combined with the possibility of continuous rolling in the rolling system.

Moreover, it also becomes possible to weld the front end face of the subsequent rolled material to the rear end face of the preceding rolled material, while pressurizing them by means of holding members and to weld these rolled materials to each other with higher accuracy, by setting, after the front end face of the subsequent rolled material has been put in contact with the rear end face of the preceding rolled material, the feed speed of the material rolled by the roughing-down mill to the same feed speed as that of the material rolled by the intermediate rolling mill.

DETAILED DESCRIPTION OF THE INVENTION

Figures 1A, 1B, 1C:
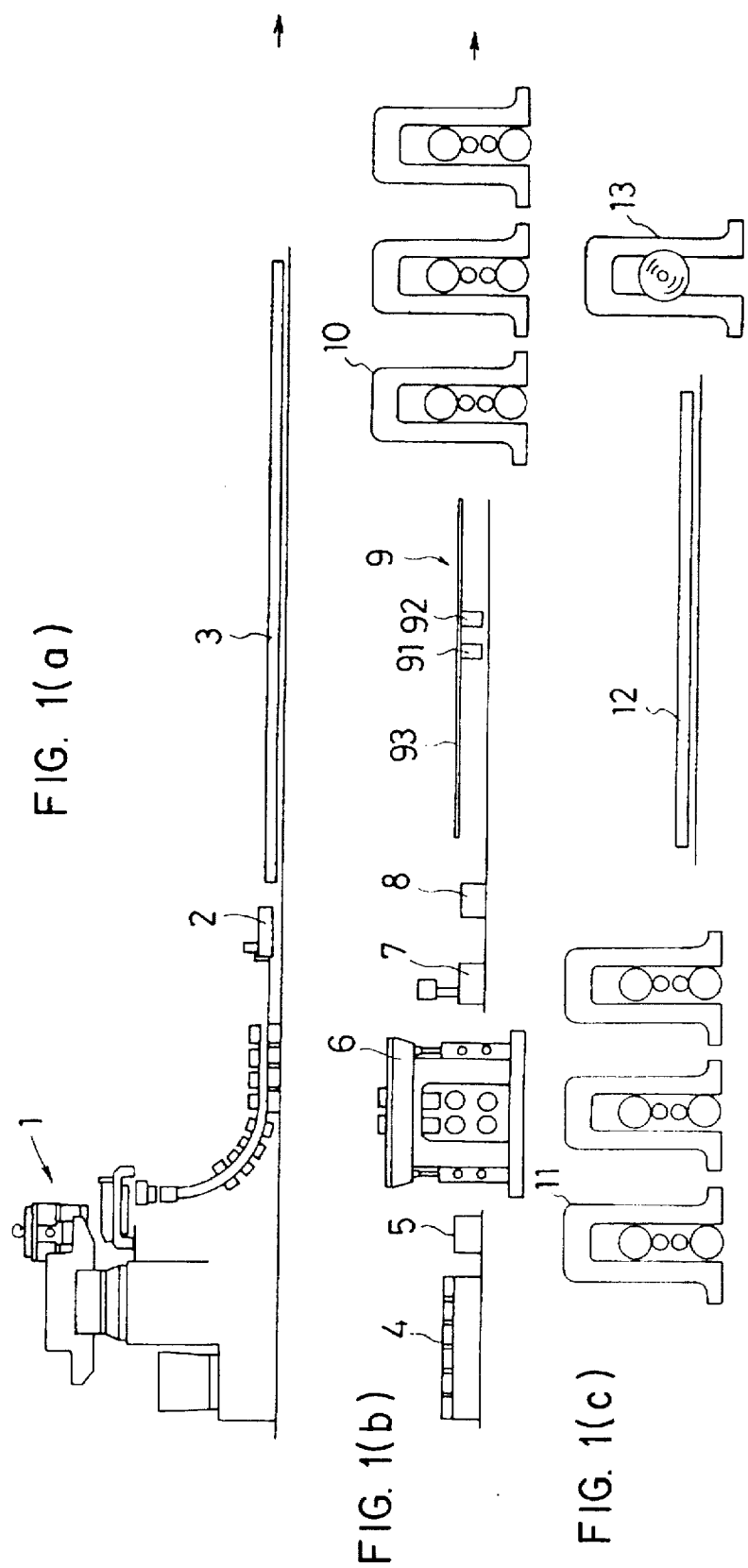
FIGS. 1(a)–(c) are side views showing an example of a system for implementing the hot rolling method according to the present invention.

An embodiment of a hot rolling method according to the present invention is described based on drawings hereafter.

FIGS. 1(a)–(c) illustrate an example of a system used for implementing the hot rolling method according to the present invention.

This system is composed of a continuous casting system 1 for feeding cast pieces, a cutter 2, a cast piece carrying table 3, a heating system 4 for uniformly heating cast pieces installed in succession to above, a descaler 5, a roughing-down mill 6, shears 7, another descaler 8, a welder 9 of rolled materials for welding the rear end face of the preceding rolled material being rolled in the intermediate rolling mill 10 to the front end face of the subsequent rolled material being rolled by the roughing-down mill 6, an intermediate rolling mill 10, a finishing mill 11, a rolled product carrying table 12 for conveying the formed rolled products, and a down coiler 13 for winding up rolled products in coil form when the rolled product is either wire rod or bar-in-coil.

For some cases, a cast piece carrying table 3 can be provided, from outside the line as required, with a billet, etc. introductory table (illustration omitted) for introducing rolled materials such as billets, etc.

The welder 9 is composed of a holding member 91 for holding a front end of the subsequent rolled material being rolled in the roughing-down mill 6, a holding member 92 for holding the rear end of a preceding rolled material being rolled in the intermediate rolling mill 10, and a guide member 93 for movably supporting both holding members 91, 92 in the direction of the rolled materials conveyance.

Those holding members 91, 92 are constructed in such a way to make it possible to apply voltage to the contact faces of the two rolled materials in a state where the front end face of the subsequent rolled material is in contact with the rear end face of the preceding rolled material, to weld both rolled materials between the roughing-down mill 6 and the intermediate rolling mill 10 with low-voltage, large-current contact resistance heating.

In such cases, by providing, on the holding members 91, 92, a drive mechanism such as a hydraulic cylinder, etc. capable of forcibly adjusting the clearance between the two holding members, it becomes possible to weld the front end face of the subsequent rolled material to the rear end face of the preceding rolled material while pressurizing them.

Moreover, it is also possible to provide an end face treating mechanism for removing the scale formed on the end face of the roller and trimming the end face of the rolled materials and, for such cases, the shears 7 and the descaler 8 provided downstream of the roughing-down mill 6 can be omitted.

Furthermore, it is possible to provide a shielding mechanism covering the entire part of the welder 9, so that the welding of the rolled materials may be carried out in an inert gas atmosphere of nitrogen gas, etc.

Next, an explanation will be given for the hot rolling method using the above-mentioned equipment.

This method consists of carrying cast pieces supplied from the continuous casting system 1 or billets supplied from the introductory billets table, etc. to the heating system 4 through the cast piece conveying table 3, uniformly heating them with the heating system 4 and, after removing the scales formed on the surface of the rolled materials by means of the descaler 8, putting the front end face of the subsequent rolled material in contact with the rear end face of the preceding rolled material by setting the feed speed of the material rolled by the roughing-down mill 6 faster than the feed speed of the material rolled by the intermediate rolling mill 10 while holding those rolled materials at the rear end of the preceding rolled material being rolled in the intermediate rolling mill 10 with the holding member 92 on one side of the welder 9 and holding the front end of the subsequent rolled material being rolled in the roughing-down mill 6 with the holding member 91 on the other side. Both rolled materials are welded between the roughing-down mill 6 and the intermediate rolling mill 10 by performing contact resistance heating with the application of voltage to the contact faces of both rolled materials through the holding members 91, 92, continuously rolling the welded rolled materials with the intermediate rolling mill 10 and the finishing mill 11 to form them into bar steel, wire rod, bar-in-coil, etc. and carrying the formed rolled products by means of the rolled product conveying table 12.

And, in cases where the rolled product is wire rod or bar-in-coil, the rolled product is wound up in the shape of a coil with the downcoiler 13.

In this case, to avoid bending of the rolled material between the roughing-down mill 6 and the intermediate rolling mill 10 at the time of welding, it is desirable to set, after the front end face of the subsequent rolled material has been put in contact with the rear end face of the preceding rolled material, the feed speed of the material rolled by the roughing-down mill 6 at the same feed speed as that of the material rolled by the intermediate rolling mill 10.

What is claimed is:

1. A hot rolling method for forming rolled materials into rolled products by rolling a rolled material with a roughing-down mill, an intermediate rolling mill and a finishing mill in order, comprising putting a front end face of a subsequent rolled material in contact with a rear end face of a preceding rolled material by setting the feed speed of the material rolled by the roughing-down mill faster than the feed speed of the material rolled by the intermediate rolling mill while holding the rear end of the preceding rolled material being rolled in the intermediate rolling mill with a holding member on one side and holding the tip of the subsequent rolled material being rolled in the roughing-down mill with a holding member on the other side, welding both rolled materials between the roughing-down mill and the intermediate rolling mill by performing contact resistance heating with the application of voltage to the contact face of both rolled materials through the holding members, and continuously rolling the welded rolled materials through the intermediate rolling mill and the finishing mill.

2. A hot rolling method as defined in claim 1, wherein the welding is performed while pressurizing the front end face of the subsequent rolled material and the rear end face of the preceding rolled material.

3. A hot rolling method as defined in claim 1 wherein, after the front end face of the subsequent rolled material has been put in contact with the rear end face of the preceding rolled material, the feed speed of the material rolled by the roughing-down mill is set at the same feed speed as that of the material rolled by the intermediate rolling mill.

4. A hot rolling method as defined in claim 2, wherein, after the front end face of the subsequent rolled material has been put in contact with the rear end face of the preceding rolled material, the feed speed of the material rolled by the roughing-down mill is set at the same feed speed as that of the material rolled by the intermediate rolling mill.

* * * * *